Figure 1:
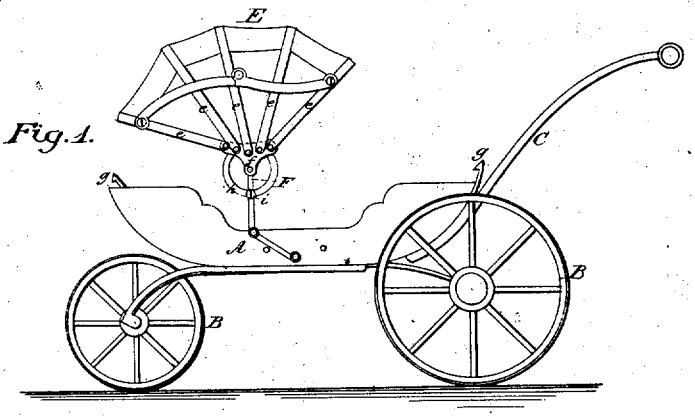

2 Sheets--Sheet 1

J. BEIN & W. ULRICH.

Children's Carriages.

No. 6,199. Reissued Dec. 29, 1874.

Witnesses:

A. L. Norris.

F. W. Howard

Inventor:

Julius Bein & William Ulrich

By James L. Norris, Atty.

2 Sheets--Sheet 2.
J. BEIN & W. ULRICH.
Children's Carriages.
No. 6,199. Reissued Dec. 29, 1874.
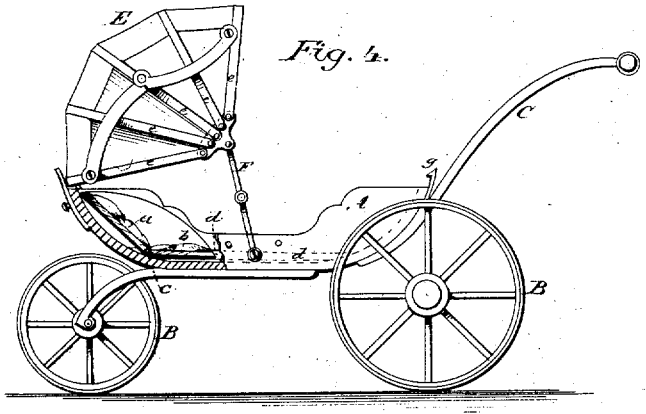
Fig. 5.
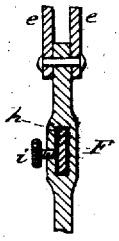
Fig. 6.
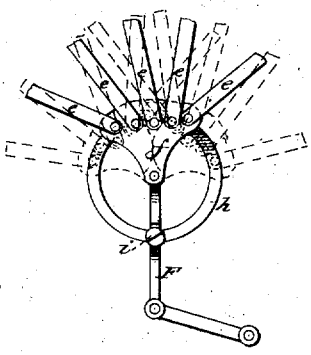
Witnesses:
A. H. Norris.
Jos. C. Wildman
Inventor:
Julius Bein & William Ulrich
By James L. Norris.
Atty.

UNITED STATES PATENT OFFICE.

BEST AVAILABLE COPY

JULIUS BEIN AND WILLIAM ULRICH, OF NEWARK, NEW JERSEY, ASSIGNORS TO RICHARDSON, McKEE & CO.

IMPROVEMENT IN CHILDREN'S CARRIAGES.

Specification forming part of Letters Patent No. 74,284, dated February 11, 1868; reissue No. 6,199, dated December 29, 1874; application filed December 9, 1874.

*To all whom it may concern:*

Be it known that we, JULIUS BEIN and WILLIAM ULRICH, both of Newark, in the county of Essex and State of New Jersey, have invented certain new and useful Improvements in Children's Carriages; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Our invention relates to certain improvements in children's carriages, its object being to provide a carriage in which the top and seat can be reversed, in order that the occupant may face the direction in which the carriage is moving and be protected from the rays of the sun or from wind, whether the carriage be pushed or drawn; and it consists, first, in a top or canopy fixed upon standards pivoted to the sides of the carriage, so that such top or canopy can be dropped behind the seat, or adjusted to an upright or any intermediate position over the seat, substantially as hereinafter set forth; second, in a top or canopy supported upon standards composed of two sections or parts, in order that the top may be dropped behind the seat, or adjusted and held in any intermediate or upright position, substantially as hereinafter specified; third, in a standard for supporting a carriage-top, composed of two parts suitably united, and provided with a device for locking said parts in any desired position, so that the carriage-top may be adjusted in any desired position or angle with respect to the seat, or dropped behind the same, or be held in an upright position, substantially as hereinafter described; fourth, in the locking device, consisting of an arc or circle attached to one of the parts of the standard, and a locking mechanism attached to the other, by which the top may be adjusted to any desired position over the seat, substantially as hereinafter set forth and described; fifth, in a carriage-body constructed alike, or nearly alike, at the front and rear, and provided with a reversible seat that can be so adjusted that the occupant may face the direction in which the carriage is moving, whether it be pushed or drawn, substantially as hereinafter set forth.

Figure 2:
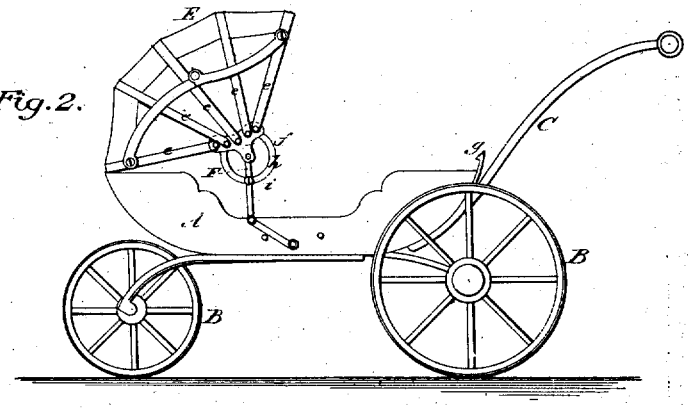
Figure 3:
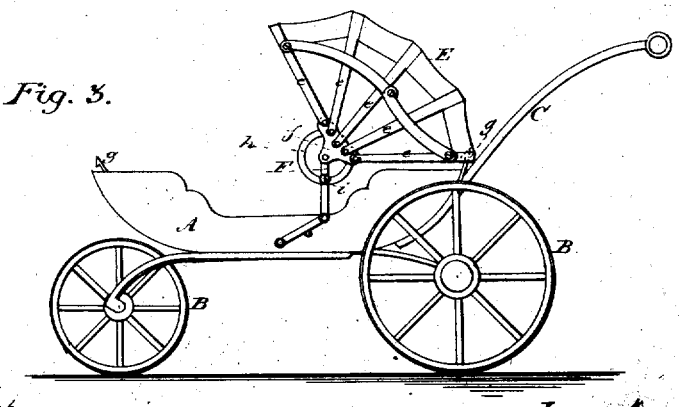

In the drawings, Figure 1 represents a side elevation, partly in section, of our improved carriage, with the top in an upright position over the seat. Fig. 2 is a similar view of the same with the top down. Fig. 3 is a similar view with the top reversed. Fig. 4 is a similar view, showing the reversible seat; and Figs. 5 and 6 are detached views of the locking device.

A represents the body of the carriage, of suitable material and size, and of any convenient design, the front and rear, however, being made as nearly alike as possible. It is supported upon three or more wheels, B B, and is provided with a tongue or bar, C, for drawing or pushing it. E is the carriage-top, which may consist of a canopy in one piece, or the ordinary folding canopy in common use. In the present instance the ordinary folding top is shown, in which the bows *e e* are pivoted to the plates *f f*, which, instead of being firmly secured to the carriage-body, are fastened or jointed to the part F, pivoted to the side boards of the body. The top can thus be swung to either side of the carriage-body, as indicated in the drawings, and can be fastened by spring catches *g*, as shown. In order to fasten the top in any desired position, an arc or circle, *h*, passing through a slot in the bar F, is attached to the plates *f*, forming a part of the standards which support the cover. A binding-screw, *i*, passes through the bar F, by means of which the top may be clamped and secured in any desired position. The seat consists of two L-shaped boards, *a b*, cushioned or upholstered as desired. From each end of the seat, at the junction of the two boards, projects a pin, *c*, which fits into a groove, *d*, in the adjoining side board. The seat can be moved in these grooves to either end of the carriage-body, and can be turned on the pin, so that it can be adjusted in either end of the body, as will be readily understood.

It will be seen that by the present construction the carriage-top can be shifted to any desired position with respect to the seat, either back of the same, directly in front of it, or to any intermediate position, where it can be adjusted and held by means of the arc or circle and clamping-screw, thus protecting the occupant from the injurious or annoying effects of the sun, wind, or rain. The seat, being reversible, may be arranged at will so that the occupant may always face the direction in which the carriage is moving, whether it is drawn or pushed; and as the cover or canopy is capable of being shifted to either the front or back of the carriage, it may be dropped behind the seat in whatever position it may be placed, or adjusted to any position that may be necessary to protect the occupant.

What we claim is—

1. A top or canopy for children's carriages, fixed upon standards connected with the sides of the carriage-body, combined so that such top or canopy can be dropped behind the seat, or adjusted to an upright or any intermediate position over the seat, substantially as and for the purpose described.

2. A top or canopy for children's carriages, supported upon standards composed of two sections or parts, connected and combined with the body so that the top may be dropped behind the seat, in front of the seat, or adjusted and held in any intermediate position, substantially as and for the purpose described.

3. A standard for supporting a carriage-top, composed of two sections or parts suitably united, and provided with a device for locking said parts in the desired position, combined so that the carriage-top may be adjusted with respect to the seat, or dropped in front or behind the same, substantially as and for the purpose described.

4. In combination with the standards for supporting a carriage-top capable of being dropped behind the seat, a locking mechanism for adjusting said standards in the desired position for holding the top upright over the seat, substantially as described.

5. The combination, with a carriage-body, of a reversible seat placed therein so that the seat can be made to face toward the front or rear of the carriage, substantially as described.

6. The combination, with a carriage-body, of a reversible seat placed therein so that, when reversed, its back can be made the seat, or the seat be made the back, substantially as described.

In testimony that we claim the foregoing we have hereunto set our hands this 17th day of November, 1874.

JULIUS BEIN.
WILLIAM ULRICH.

Witnesses:
DANIEL LAUCK,
GEORGE MCKEE.